United States Patent [19]
Takamizawa et al.

[11] 3,872,123
[45] Mar. 18, 1975

[54] CERTAIN THIAMINE DISULFIDE COMPOUNDS

[75] Inventors: Akira Takamizawa, Osaka; Kentaro Hirai, Kyoto; Hiroshi Oikawa, Kusatsu; Kunihei Inazu, Suita, all of Japan

[73] Assignee: Shionogi & Co., Ltd., Osaka, Japan

[22] Filed: Sept. 26, 1972

[21] Appl. No.: 292,454

[30] Foreign Application Priority Data
Oct. 4, 1971   Japan.............................. 46-77774

[52] U.S. Cl............ 260/256.5 B, 424/251, 424/255
[51] Int. Cl............................................. C07d 51/42
[58] Field of Search ............................ 260/256.5 B

[56] References Cited
UNITED STATES PATENTS
3,734,913   5/1973   Takamizawa et al. ....... 260/256.5 B FOREIGN PATENTS OR APPLICATIONS
43-21736   9/1968   Japan.......................... 260/256.5 B

*Primary Examiner*—R. Gallagher
*Attorney, Agent, or Firm*—Wenderoth, Lind & Ponack

[57] ABSTRACT

Thiamine disulfide compounds represented by the formula:

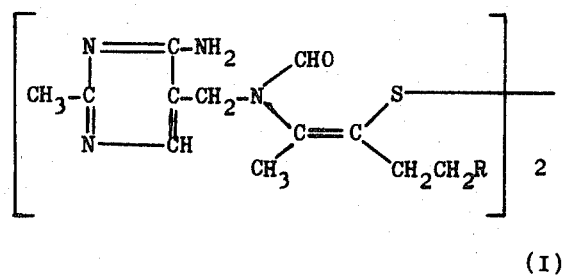

wherein R represents an alkylthio group containing 1 to 4 carbon atoms or an alkylsulfinyl group containing 1 to 4 carbon atoms, being useful as anti-coccidial agents for poultry, are prepared by two routes.

3 Claims, No Drawings

CERTAIN THIAMINE DISULFIDE COMPOUNDS

The present invention relates to thiamine disulfide compounds, and production thereof. More particularly, this invention relates to thiamine disulfide compounds and their acid-addition salts, having anticoccidial activity for poultry, and their production.

The said thiamine disulfide compounds are represented by the formula:

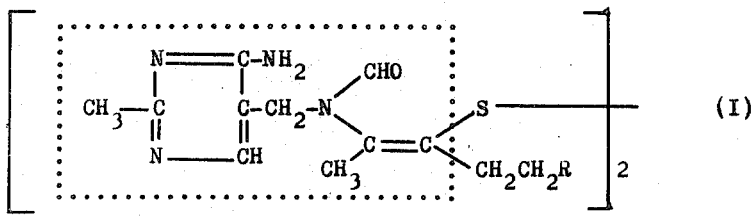
(I)

coccidial agents. A further object of the invention is to embody a process for preparing the thiamine disulfide compounds (I), and their acid-addition salts. These and other objects will be apparent to those conversant with the art to which the present invention pertains from the following description.

The said thiamine disulfide compounds (I) can be prepared by the following two routes: Route A

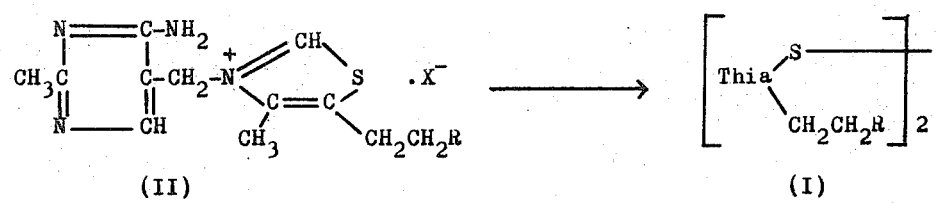

Route B

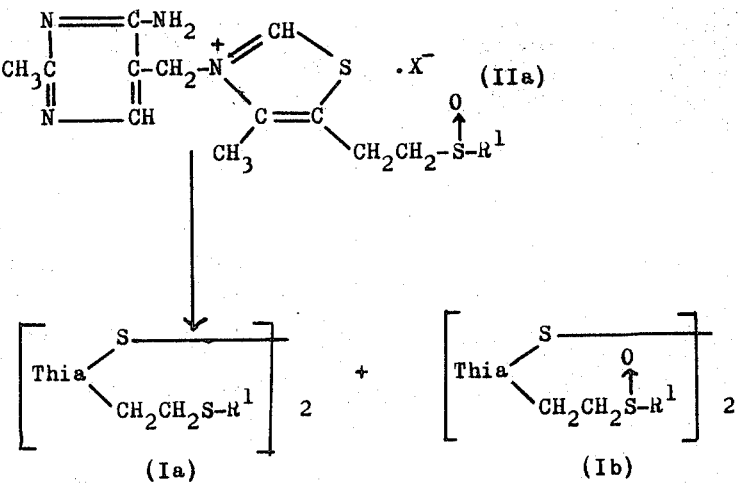

wherein R represents an alkylthio group containing 1 to 4 carbon atoms (e.g., methylthio, ethylthio, n-butylthio) or an alkylsulfinyl group containing 1 to 4 carbon atoms (e.g., methylsulfinyl, ethylsulfinyl, isopropylsulfinyl). (The partial formula encompassed by the dotted line in the above formula will be hereinafter abbreviated as "Thia.")

Accordingly, it is a basic object of the present invention to embody the thiamine disulfide compounds (I), and their acid-addition salts. Another object of this invention is to embody the thiamine disulfide compounds (I), and their acid-addition salts being useful as antiwherein X represents an acid residue (e.g., a residue of an inorganic acid, including hydrochloric acid, sulfuric acid, nitric acid, thiocyanic acid and phosphoric acid; or a residue of an organic acid, including succinic acid, benzoic acid, benzenesulfonic acid, naphthalenesulfonic acids, tartaric acid, and acetic acid), $R^1$ represents an alkyl group containing 1 to 4 carbon atoms (e.g., methyl, ethyl, isopropyl, sec-butyl), and R is as defined above.

Route A:

The starting thiazolium salt (II) can be prepared, for example, by reacting the 2-methyl-4-amino-5- halogenomethylpyrimidine with the 4-methyl-5-(2-alkylthioethyl)-thiazole to give the thiazolium salt (IIb) and oxidizing said thiazolium salt (IIb), as shown in the following scheme:

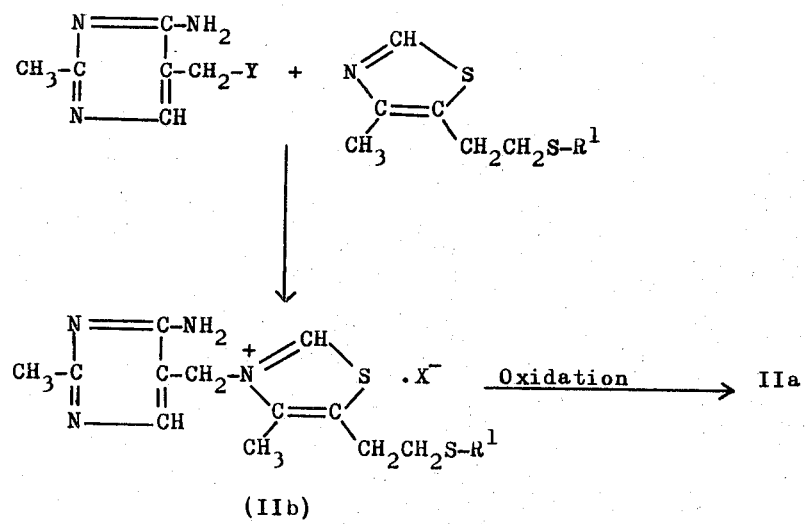

wherein Y represents a halogen atom (e.g., chlorine, bromine, iodine), and $R^1$ and X each is as defined above [Takamizawa, et al.: Belgian Pat. No. 757,947]. This route is carried out by oxidizing the thiazolium salt (II) in the presence of a base (e.g., sodium hydroxide, potassium hydroxide, sodium ethoxide, lithium carbonate, calcium hydroxide) in an amount at least sufficient to afford the alkali or alkali earth thiolate in the presence of an inert solvent (e.g., water, a mixture of water with methanol, ethanol, chloroform, or methylene chloride) with or without cooling or heating. Examples of the oxidizing agent are potassium ferricyanate, iodine-potassium iodide, hydrogen peroxide, air in the presence of a ferrous ion, and other conventional oxidizing agents for converting a thiol into the corresponding disulfide. These oxidizing agents may be used in a conventional manner.

Route B:

The starting thiazolium salt (IIa) is prepared in the above mentioned preparation of said thiazolium salt (II). This route is carried out by treating the thiazolium salt (IIa) with a base (e.g., sodium hydroxide, potassium hydroxide, calcium hydroxide, lithium carbonate, potassium bicarbonate, sodium ethoxide) in an amount sufficient to afford the thiol but not to exceed in an inert solvent (e.g., water, a mixture of water with methanol, ethanol, chloroform, dimethylsulfoxide, dimethylformamide, or methylene chloride) at room temperature or with heating. This reaction can proceed also in a solid diluent (e.g., glucose, lactose, starch). This reaction is considered to proceed via the intermediate represented by the following formula:

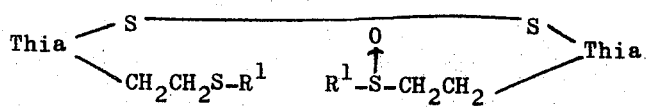

Thus obtained thiamine disulfide compounds (I) (i.e. Ia, Ib) may, when required, be converted into acid-addition salts suitable for pharmaceutical use, having low toxicity and desirable stability. Such a conversion can be effected in a conventional manner such as treating the thiamine disulfide compound (I) with an acid in an appropriate solvent. Examples of the pharmaceutically acceptable acid-addition salts are hydrochloride, hydrobromide, hydroiodide, sulfate, nitrate, phosphate, thiocyanate, oxalate, succinate, and naphthalenedisulfonates.

Thus obtained thiamine disulfide compounds (I) or their acid-addition salts are useful as an anti-coccidial agent in prophylaxis and/or therapy. Avian coccidiosis due to Eimeria tenella, Eimeria necatrix, or Eimeria acervulina induces lesions in the digestive organs, general prostration death and growth inhibition in poultry such as chicks, turkeys, or ducks. Compounds heretofore used as anti-coccidial agents include sulfa drugs, nitrofurans, quinolines, anti-thiamine agents, benzamides and antibiotic substances. These known anti-coccidial agents suffer from some drawbacks in their degree of the anti-coccidial activity, their toxicity to the hosts and the emergence of strains having drug resistance owing to misuse of the drugs over a long period. Such factors have gradually decreased the value of the known drugs. Advantages of the present invention consist in that the thiamine disulfide compounds (I) or their acid-addition salts have low toxicity to host poultry, and the said compounds (I) or their acid-addition salts show very powerful anti-coccidial activity for both prophylaxis and treatment of the disease.

For anti-coccidial compositions, comprising the said thiamine disulfide compounds (I) or their acid-addition salts, suitable preparations which may be used, include: powders, granules, solutions, dispersions, premixes, capsules, emulsions, tablets, etc. These compounds may be used singly or in combination with an appropriate carrier ordinarily used in this field. There can be combined ordinarily additives, vehicles, disintegrating agents, lubricants, and coating materials. In general, a suitable concentration of the thiamine disulfide compounds (I) or their acid-addition salts for poultry feed is at least 0.003 weight percent. For prophylactic use, suitable concentration of the drug (I) is about 0.003 to about 0.06 weight percent, more favorably about 0.003 to about 0.02 weight percent, and for therapeutic purpose a suitable concentration is about 0.01 weight percent to about 0.16 weight percent. For instance, solution, suspension or emulsion may be added to drinking water; capsules or tablets may be administered orally as they are. By the carrier is meant a diluent to be ordinarily added into poultry feed and involves illustratively water, lactose, sucrose, talc, pectin, wheat powder, rice bran, wheat bran, corn powder, soy bean meal, crushed grain powder, and the like. The present anti-coccidial compositions may be optionally used in combination with animal drugs including antibiotics, other known anti-coccidial agents and anthelmintics.

The practical effects of the anti-coccidial agents of this invention are shown by the following experiments.

a. Test Method:

Several groups of test animals, each group consisting of five White Leghorn chicks were orally infected with 50,000 sporulated oocysts of *Eimeria tenella* per chick. Test animals were given with feed containing test compounds for 8 days after infection. On the 8th day, test animals were anatomized, and cecal lesions were observed. During the period of administration of the test compound, the number of the hematochezia, ratio of survival, relative weight gain, number of oocysts and cecal lesion score were determined.

b. Test Compound:

When anti-coccidial activity against *Eimeria necatrix* was examined in the same manner as above, the present thiamine disulfide compounds (Compound No. 2 and Compound No. 3) were completely prophylactic in a concentration of 0.02 percent in the feed and effective in a concentration of 0.005 percent in the feed. Still, Compound No. 3 was effective against *Eimeria acervulina* in a concentration of 0.08 percent in the feed.

Acute toxicity of the present thiamine disulfide compounds (Compound No. 2 and Compound No. 3) was examined by intraperitoneal administration in an aqueous suspension of the test compound to chicks, and the results of the acute toxicity test are shown in Table 2.

Table 2

|  |  | Acute toxicity | (Number of dead) | (Number of treated) |
|---|---|---|---|---|
| Compound No. |  |  | 2 | 3 |
| Dose (mg/kg, i.p.) | 182 |  | 0/6 | 0/6 |
|  | 273 |  | 1/6 | 0/6 |
|  | 410 |  | 0/6 | 0/6 |
|  | 615 |  | 4/6 | 0/6 |
|  | 922 |  | 6/6 | 0/6 |
|  | 1384 |  | 5/6 | 0/6 |
|  | 2076 |  | 6/6 | 0/6 |

Clearly, as shown in the above results on the prophylaxis and treatment for avian coccidiosis, the thiamine

| Compound No. | Compound Name | Note |
|---|---|---|
| 1 | 3-(2-Methyl-4-aminopyrimidin-5-ylmethyl)-4-methyl-5-(2-sulfoethyl)thiazolium chloride hydrate | Control |
| 2 | Bis-{2-[N-(2-methyl-4-aminopyrimidin-5-ylmethyl)formamido]-1-(2-methylsulfinylethyl)-1-propenyl} disulfide | Subject matter of this invention |
| 3 | Bis-{2-[N-(2-methyl-4-aminopyrimidin-5-ylmethyl)formamido]-1-(2-methylthioethyl)-1-propenyl} disulfide | Subject matter of this invention | c. Results:

The results of the test against cecal coccidiosis in White Leghorn chicks are shown in Table 1.

disulfide compounds (Compound No. 2 and Compound No. 3) show anti-coccidial activity superior to that of the analogous 2-sulfoethylthiazolium salt (Com- Table 1

| Compound No. | Concn. (%) in feed | Total of hematochezia* | Survival ratio (%) | Relative weight gain (%)  | Number of oocyst (O.P.G.) * | Cecal lesion score **** |
|---|---|---|---|---|---|---|
| 1 | 0.01 | 52 | 60 | 81 | $1.6 \times 10^6$ | 20 |
| 2 | 0.02 | 0 | 100 | 126 | 0 | 0 |
|  | 0.01 | 0 | 100 | 100 | $1.2 \times 10^4$ | 1 |
|  | 0.005 | 5 | 100 | 96 | $2.9 \times 10^5$ | 11 |
|  | 0.0025 | 2800 | 100 | 89 | $1.5 \times 10^6$ | 20 |
| 3 | 0.02 | 0 | 100 | 111 | 0 | 0 |
|  | 0.01 | 0 | 100 | 124 | 0 | 1 |
|  | 0.005 | 9 | 100 | 102 | $2.8 \times 10^5$ | 6 |
|  | 0.0025 | 2800 | 100 | 102 | $2.0 \times 10^6$ | 18 |
| Control | (a) | 2800 | 80 | 21 | $6.3 \times 10^5$ | 20 |
|  | (b) | 0 | 100 | 100 | 0 | 0 |

*) shows the total count of hematochezia per 5 chicks, and 00 shows that too many counts were observed.
**) shows the ratio of the increased body weight of chicks in treated groups orinfected control group to that of chicks in uninfected control group.
***) shows the count of oocysts existing per gram of feces in chicks which is abbreviated as O.P.G.
****) shows the degree of pathological change in cecum. Survival chicks were anatomized on the 8th day after infection, and degrees of pathological change in cecum were observed macroscopically. Degrees of pathological change in cecum were classified into 5 orders from 0 to 4 (serious, 4; considerable, 3; moderate, 2; slight, 1; almost sound, 0). Total (0 to 20) of the score was calculated for each group of 5 chicks.
(a): Infected case.
(b): Uninfected case pound No. 1). These compounds have very low toxicity.

Presently-preferred and practical embodiments of the present invention are illustratively shown in the following examples.

EXAMPLE 1

3-(2-Methyl-4-aminopyrimidin-5-ylmethyl)-4-methyl-5-(2-methylsulfinylethyl)thiazolium chloride hydrochloride dihydrate (8.2 g) is dissolved in N-aqueous sodium hydroxide solution (60 ml) with ice cooling, and the solution is allowed to stand for half an hour. A solution of iodine (2.6 g) and potassium iodide (6 g) in water (200 ml) is added dropwise in an hour below 10°C thereto, and the resultant mixture is stirred for half an hour. The reaction mixture is evaporated under reduced pressure, and the residue is extracted with n-butanol. The n-butanol layer is evaporated under reduced pressure, and the residue is crystallized from ether. The crystals are chromatographed on a column of alumina/ethanol to give bis-{2-[N-(2-methyl-4-aminopyrimidin-5-ylmethyl)formamido]-1-(2-methylsulfinylethyl)-1-propenyl} disulfide (2g) as colorless prisms melting at 168° to 170°C (decomp.). UV: $\lambda_{max}^{EtOH}$ 234 m$\mu$(log $\epsilon$ 4.41), 279 m$\mu$(log $\epsilon$ 4.04).

EXAMPLE 2

3-(2-Methyl-4-aminopyrimidin-5-ylmethyl)-4-methyl-5-(2-methylsulfinylethyl)thiazolium chloride hydrochloride dihydrate (16.8 g) is added to a solution of sodium hydroxide (4.8 g) in water (40 ml) with ice cooling, and the mixture is stirred at 10°C for 15 minutes. A solution of potassium ferricynate (13.2 g) in water (70 ml) is added dropwise below 10°C in 15 minutes thereto. The resultant mixture is adjusted to pH 11 1.5 with 10 percent aqueous sodium hydroxide solution and stirred at room temperature for 1.5 hours. The reaction mixture is extracted with n-butanol. The organic layer is washed with water, dried and evaporated under reduced pressure to give bis-{2-[N-(2-methyl-4-amino-pyrimidin-5-ylmethyl)formamido]-1-(2-methylsulfinylethyl)-1-propenyl} disulfide (12.7 g). This substance is recrystallized from ethanol to give colorless prisms melting at 168° to 170°C (decomp.).

EXAMPLE 3

3-(2-Methyl-4-aminopyrimidin-5-ylmethyl)-4-methyl-5-(2-methylthioethyl)thiazolium chloride hydrochloride hydrate (1.16 g) is dissolved in a solution of sodium hydroxide (0.36 g) in water (6 ml) with ice cooling, and the solution is allowed to stand for half an hour. A solution of potassium ferricynate (0.988 g) in water (4 ml) is added dropwise thereto, and the mixture is adjusted to pH 11.5 to 11.8 with 10 percent sodium hydroxide solution. The resultant mixture is kept at 15°C for 1.5 hours with stirring, and the precipitate is filtered, washed with water and dried to give bis-{2-[N-(2-methyl-4-aminopyrimidin-5-ylmethyl)formamido]-1-(2-methyl-thioethyl)-1-propenyl} disulfide hydrate (0.87 g). The crystals are recrystallized from aqueous ethanol to give colorless needles, which begin to melt at about 85°C and complete melting at about 130°C to give a yellowish white fused liquid. This hydrate is recrystallized from ethyl acetate to give the anhydrous colorless prisms melting at 164° to 165°C.

EXAMPLE 4

3-(2-Methyl-4-aminopyrimidin-5-ylmethyl)-4-methyl-5-(2-methylthioethyl)thiazolium chloride hydrochloride hydrate (1.16 g) is dissolved in a solution of sodium hydroxide (0.36 g) in water (6 ml) with ice cooling, and the solution is allowed to stand at room temperature for half an hour. A solution of iodine (0.38 g) and potassium iodide (0.9 g) in water (30 ml) is added dropwise in half an hour, and the resultant mixture is stirred for an hour. The precipitate is filtered, washed with water and dried to give bis-{2-[N(2-methyl-4-aminopyrimidin-5-ylmethyl)formamido]-1-(2-methylthioethyl)-1-propenyl} disulfide hydrate (0.72 g).

EXAMPLE 5

3-(2-Methyl-4-aminopyrimidin-5-ylmethyl)-4-methyl-5-(2-methylthioethyl)thiazolium chloride hydrochloride hydrate (1.16 g) is dissolved in a solution of sodium hydroxide (0.36 g) in water (6 ml) with ice cooling, and the solution is allowed to stand at room temperature for half an hour. A 30 percent hydrogen peroxide solution (0.68 g) is added dropwise thereto. The resultant mixture is kept at pH 11.8 and stirred with ice cooling for 2 hours. The precipitate is filtered, washed with water and dried to give bis-{2-[N-(2-methyl-4-amino-pyrimidin-5-ylmethyl)formamido]-1-(2-methylthioethyl)-1-propenyl} disulfide hydrate (0.501 g).

EXAMPLE 6

3-(2-Methyl-4-aminopyrimidin-5-ylmethyl)-4-methyl-5-(2-methylsulfinylethyl)thiazolium chloride hydrochloride dihydrate (210 g) is dissolved in water (420 ml), and 10 percent aqueous sodium hydroxide solution (400 g) is added thereto. The resultant solution is heated at 50°C, and kept at pH 7.1 with 10 percent aqueous sodium bicarbonate solution. The solution is allowed to stand at room temperature for 2 days. The precipitate is filtered. The said precipitate is recrystallized from aqueous ethanol and chromatographed on a column of silica gel to give bis-{2-[N-(2-methyl-4-aminopyrimidin-5-ylmethyl) formamido]-1-(2-methylthioethyl)-1-propenyl} disulfide (60.3 g) as crystals melting at 164° to 165°C. The filtrate is shaken with n-butanol. The n-butanol layer is evaporated under reduced pressure to give bis-{2-[N-(2-methyl-4-aminopyrimidin-5-ylmethyl)-formamido]-1-(2-methylsulfinylethyl)-1-propenyl} disulfide (23.3 g) as crystals melting at 168° to 170°C (decomp.).

EXAMPLE 7

Bis-{2-[N-(2-methyl-4-aminopyrimidin-5-ylmethyl)-formamido]-1-(2-methylsulfinylethyl)-1-propenyl} disulfide is admixed with 9 times its weight of lactose. The powder is dissolved in 1,000 to 2,000 volumes of water before use.

EXAMPLE 8

Bis-{2-[N-(2-methyl-4-aminopyrimidin-5-ylmethyl)-formamido]-1-(2-methylthioethyl)-1-propenyl} disulfide (10 parts by weight) is admixed with rice bran (90 parts by weight) to give a homogeneous mix. The mix is diluted with chicken feed to a concentration of 0.008 to 0.015 percent of the effective ingredient in the feed before use.

EXAMPLE 9

Bis-{2-[N-(2-methyl-4-aminopyrimidin-5-ylmethyl)-formamido]-1-(2-methylsulfinylethyl)-1-propenyl} disulfide (25 parts by weight) is admixed with wheat powder (75 parts by weight) to give a homogenous mix. The mix is diluted 50 to 1,000 fold with chicken feed before use.

What is claimed is:

1. Thiamine disulfide compounds represented by the formula:

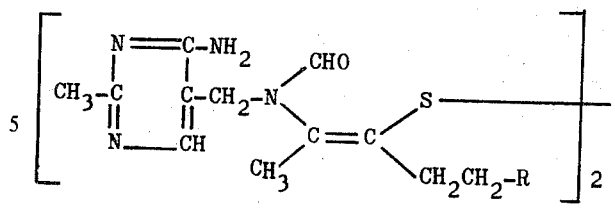

wherein R represents an alkylthio group containing 1 to 4 carbon atoms or an alkylsulfinyl group containing 1 to 4 carbon atoms, or their pharmaceutically acceptable acid-addition salts.

2. A thiamine disulfide compound according to claim 1, in which R is methylthio.

3. A thiamine disulfide compound according to claim 1, in which R is methylsulfinyl.

* * * * *